(12) United States Patent
Ponten et al.

(10) Patent No.: US 8,499,535 B2
(45) Date of Patent: Aug. 6, 2013

(54) DEVICE FOR PACKAGING PRODUCTS IN A FOIL PACKAGE

(75) Inventors: Marius Petrus Josef Johannes Robertus Ponten, Lierop (NL); Robertus Maria Vollenbroek, Vlodrop (NL)

(73) Assignee: PMB-UVA International B.V., Av Eindhoven (NL)

( * ) Notice: Subject to any disclaimer, the term of this patent is extended or adjusted under 35 U.S.C. 154(b) by 377 days.

(21) Appl. No.: 12/992,138

(22) PCT Filed: May 6, 2009

(86) PCT No.: PCT/NL2009/000111
§ 371 (c)(1),
(2), (4) Date: Nov. 11, 2010

(87) PCT Pub. No.: WO2009/139618
PCT Pub. Date: Nov. 19, 2009

(65) Prior Publication Data
US 2011/0061346 A1    Mar. 17, 2011

(30) Foreign Application Priority Data
May 16, 2008    (NL) .................................... 1035429

(51) Int. Cl.
*B65B 9/20* (2012.01)
*B65B 59/04* (2006.01)
*B29C 53/48* (2006.01)

(52) U.S. Cl.
USPC .............. 53/551; 493/308; 493/439; 156/466

(58) Field of Classification Search
CPC  B65B 51/26; B65B 41/16; B65B 59/04; B65B 2220/12; B65B 9/20; B65B 9/2056; B65B 9/2021; B65B 9/22; B29C 53/54; B29C 53/48

USPC .................. 53/550, 551; 493/193, 248, 308, 493/436, 438, 439, 440, 447, 455, 458; 156/466
See application file for complete search history.

(56) References Cited

U.S. PATENT DOCUMENTS 1,892,629 A * 12/1932 Pfeiffer ........................ 156/122
2,320,326 A *  5/1943 Avery ........................... 493/248
(Continued)

FOREIGN PATENT DOCUMENTS
EP    0 307 125 B1    2/1993
NL    C 1032764      12/2007

OTHER PUBLICATIONS

International Search Report, for PCT/NL2009/000111, mailed Jul. 14, 2009, 4 pages.

*Primary Examiner* — Stephen F Gerrity
(74) *Attorney, Agent, or Firm* — Fay Sharpe LLP

(57) ABSTRACT

A device for packaging products in a foil package includes a feeder for continuously supplying a foil web from a supply roll to a corner forming unit. The corner forming unit includes a curved deforming edge for deforming the flat foil web to a curved foil web having a reduced width, a deformer for forming a profile in the curved foil web, a roller for flattening the foil web, with the reduced width of the foil web at least substantially being maintained and overlapping sections being formed at the location of the profile, and a sealer for sealing the overlapping sections. The deforming edge and the deformer form part of an exchangeable unit. The sealer is movable along at least one guide, with the corner forming unit comprising aligning elements associated with the sealer, which aligning elements cooperate with further aligning elements associated with the deformer for correctly positioning the sealer relative to the deformer.

20 Claims, 6 Drawing Sheets

U.S. PATENT DOCUMENTS

| | | | |
|---|---|---|---|
| 3,555,973 A * | 1/1971 | Rochla | 493/297 |
| 3,844,090 A * | 10/1974 | Pepmeier | 53/551 |
| 6,343,455 B2 * | 2/2002 | Bois | 53/551 |
| 7,275,354 B2 * | 10/2007 | Frievalt et al. | 53/551 |
| 7,325,379 B2 * | 2/2008 | Kettner et al. | 53/551 |
| 2001/0005979 A1 * | 7/2001 | Kuss et al. | 53/551 |
| 2002/0020153 A1 * | 2/2002 | Klinkel | 53/551 |
| 2005/0014623 A1 * | 1/2005 | Van De Kruys et al. | 493/162 |
| 2005/0069230 A1 * | 3/2005 | Takahashi et al. | 53/451 |
| 2005/0113233 A1 * | 5/2005 | Ferfolja et al. | 493/165 |
| 2009/0217623 A1 * | 9/2009 | Haak et al. | 53/389.3 |

* cited by examiner

Fig. 1

DEVICE FOR PACKAGING PRODUCTS IN A FOIL PACKAGE

CROSS-REFERENCE TO RELATED APPLICATIONS

This application is a national stage entry of international application number PCT/NL2009/000111, having international filing date of May 6, 2009, which was published in English, and which claims priority to Netherlands Patent Application No. NL 1035429, filed May 16, 2008, the entireties of which are hereby incorporated by reference as if fully set forth herein.

The present invention relates to a device for packaging products in a foil package, comprising feed-through means for continuously supplying a foil web from a supply roll to a corner forming unit, said corner forming unit comprising, in succession, a curved deforming edge for deforming the flat foil web to a curved foil web having a reduced width, at least in perpendicular view, deforming means for forming a profile in the curved foil web, a roller for flattening the profiled foil web, with the reduced width of the foil web at least substantially being maintained and overlapping sections being formed at the location of the profile, and sealing means for sealing said overlapping sections, said device further comprising a shoulder element, to which the foil web comprising the sealed overlapping sections is supplied by the feed-through means for deforming the foil web into a tube at the location of the shoulder element, along the path of which tube further sealing means are disposed for joining longitudinal edges of the foil web together and forming a sealed bottom side and upper side of a package perpendicular to the longitudinal direction of the tube, with the sealed overlapping sections forming the corners of the package.

Such a packaging device is known from Dutch patent NL 1032764. In the two packaging machines described in said document, a flat foil web is converted into a curved foil web by means of a curved plate, along a curved edge of which the foil web is passed. The curved foil is passed along forming blocks, imparting a merlon shape to the foil, which is stretched over a roller, so that a flat foil web is formed again, which now has overlapping sections, however. The foil material is sealed together at the location of the overlapping sections so as to thus form the eventual corners of the package. The sealed overlapping sections are also referred to as "corner seals" in technical jargon.

When using such packaging machines it is generally desirable to be able to use the same packaging machine for processing foil webs of varying width so as to realise packages having varying dimensions. To that end it is necessary to alter the set-up of the various parts of the corner forming unit, such as in particular the forming blocks and the sealing means, which is a time-consuming job, so that valuable production time is lost. The object of the present invention is to eliminate this considerable drawback to a significant extent, making it possible to realise a significant reduction of the time required for altering the set-up. In order to accomplish that object, the present invention is in the first place characterised in that the deforming edge and the deforming means form part of an exchangeable switch unit and in that the sealing means are movable along at least one guide extending parallel to the central axis of the roller, with the corner forming unit comprising aligning elements associated with the sealing means, which aligning elements cooperate with further aligning elements associated with at least some of the deforming means for correctly positioning the sealing means relative to the deforming means. By making use of an exchangeable switch unit, of which the deforming edge and the deforming means form part, said parts of the corner forming unit can be set up quickly for processing a foil web of a different width by exchanging a switch unit for another switch unit having a differently shaped deforming edge and/or differently positioned deforming means. Because of the cooperation between the aligning elements of the sealing means and said further aligning elements associated with the respective deforming means, also the sealing means can be adjusted very quickly to the desired longitudinal position of the guide. Although the invention has be explained above on the basis of the fact that altering the set-up of the packaging device is necessary within the framework of processing foil webs of varying width, those skilled in the art will appreciate that the advantage of a shorter set-up change also plays a part when foil webs of the same width are to be processed but wherein different positions and/or shapes of the corners of the eventual packages are to be realised. It is for example the height of the deforming means that determines the eventual height of the corner seals.

The aligning elements and the further aligning elements are preferably of the mortise and tenon type, by means of which a very quick and accurate positioning of the sealing means relative to the deforming means can be achieved.

In use, it is inevitable in practice that the foil web is presented to the shoulder element with the sealed overlapping sections not exactly in the correct transverse position, because the foil web inevitably tends to move not only in its own conveying direction but also, to a limited extent, in its own plane perpendicular to its conveying direction. To provide a solution to this problem, another preferred embodiment of the invention is characterised in that the device further comprises sensor means for detecting the position of a longitudinal edge of the foil web, as well as moving means for moving at least one pulley, over part of the circumference of which the foil web is passed between the corner forming unit and the shoulder element, and the supply roll transversely to the direction of movement of the foil web in dependence on detections made by the sensor means, whilst the corner forming unit and the shoulder element maintain a fixed orientation relative to each other during operation of the moving means. It has surprisingly been found that the fixed orientation of the corner forming unit and the shoulder element during operation of the moving means constitutes a significant improvement as regards the correction of the transverse position of the sealed overlapping sections relative to the shoulder element, which improvement can be realised through the use of the sensor means and the moving means. The sealed overlapping sections are thus positioned exactly in the corners of the package.

The advantages of the present preferred embodiment are also obtained with packaging devices according to the prior art as described in the foregoing. The device is in that case a device for packaging products in a foil package, comprising feed-through means for continuously supplying a foil web from a supply roll to a corner forming unit, said corner forming unit comprising, in succession, a curved deforming edge for deforming the flat foil web to a curved foil web having a reduced width, at least in perpendicular view, deforming means for forming a profile in the curved foil web, a roller for flattening the profiled foil web, with the reduced width of the foil web at least substantially being maintained and overlapping sections being formed at the location of the profile, and sealing means for sealing said overlapping sections, said device further comprising a shoulder element, to which the foil web comprising the sealed overlapping sections is supplied by the feed-through means for deforming the foil web into a tube at the location of the shoulder element, along the path of which tube further sealing means are disposed for joining longitudinal edges of the foil web together and forming a sealed bottom side and upper side of a package perpendicular to the longitudinal direction of the tube, with the sealed overlapping sections forming the corners of the package, the device further comprising sensor means for detecting the position of a longitudinal edge of the foil web, as well as moving means for moving at least one pulley, over part of the circumference of which the foil web is passed between the corner forming unit and the shoulder element, and the supply roll transversely to the direction of movement of the foil web in dependence on detections made by the sensor means, whilst the corner forming unit and the shoulder element maintain a fixed orientation relative to each other during operation of the moving means.

The correction of the transverse position of the foil web is further improved if the moving means are also arranged for moving at least one pulley, over part of the circumference of which the foil web is passed between the corner forming unit and the supply roll, transversely to the direction of movement of the foil web in dependence on detections made by the sensor means, wherein furthermore preferably said moving means are arranged for jointly moving said at least one pulley between the corner forming unit and the shoulder element, the supply roll and said at least one pulley between the corner forming unit and the supply roll to the same extent.

According to another preferred embodiment, the sealing means comprise an arcuate sealing shoe, which is concentric with a roller, over part of the circumference of which the foil web extends, wherein the sealing shoe is pivotally connected, about a pivot axis that extends parallel to the central axis of the roller, to a support for the sealing shoe via hinge means, which preferably comprise a film hinge, and wherein the sealing shoe can be fixed in its pivoted position relative to the support via fixing means.

The characteristic aspects of the preceding preferred embodiments can also be used advantageously in prior art packaging devices. The device is in that case a device a device for packaging products in a foil package, comprising feed-through means for continuously supplying a foil web from a supply roll to a corner forming unit, said corner forming unit comprising, in succession, a curved deforming edge for deforming the flat foil web to a curved foil web having a reduced width, at least in perpendicular view, deforming means for forming a profile in the curved foil web, a roller for flattening the profiled foil web, with the reduced width of the foil web at least substantially being maintained and overlapping sections being formed at the location of the profile, and sealing means for sealing said overlapping sections, said device further comprising a shoulder element, to which the foil web comprising the sealed overlapping sections is supplied by the feed-through means for deforming the foil web into a tube at the location of the shoulder element, along the path of which tube further sealing means are disposed for joining longitudinal edges of the foil web together and forming a sealed bottom side and upper side of a package perpendicular to the longitudinal direction of the tube, with the sealed overlapping sections forming the corners of the package, and wherein the sealing means comprise an arcuate sealing shoe, which is concentric with a roller, over part of the circumference of which the foil web extends, wherein the sealing shoe is connected to a support for the sealing shoe via hinge means, which preferably comprise a film hinge, being pivotable about a pivot axis that extends parallel to the central axis of the roller, and wherein the sealing shoe can be fixed in its pivoted position relative to the support via fixing means.

The present invention further relates to a corner forming unit for use in a device according to the invention, comprising, in succession, a curved deforming edge for deforming the flat foil web to a curved foil web having a reduced width, at least in perpendicular view, deforming means for forming a profile in the curved foil web, a roller for flattening the profiled foil web, with the reduced width of the foil web at least substantially being maintained and overlapping sections being formed at the location of the profile, and sealing means for sealing said overlapping sections, said deforming edge and said deforming means forming part of an exchangeable switch unit and said sealing means being movable along at least one guide extending parallel to the central axis of the roller, and comprising aligning elements which cooperate with further aligning elements of the deforming means for correctly positioning the sealing means relative to the deforming means. The advantages obtained by using such a corner forming unit have already been elucidated in the foregoing in the description of the device according to the invention.

The invention will now be explained in more detail by means of a description of a preferred embodiment of the present invention, in which reference is made to the appended figures:

FIG. 1 is a side view of a preferred embodiment of a packaging device according to the invention;

Figure 1:
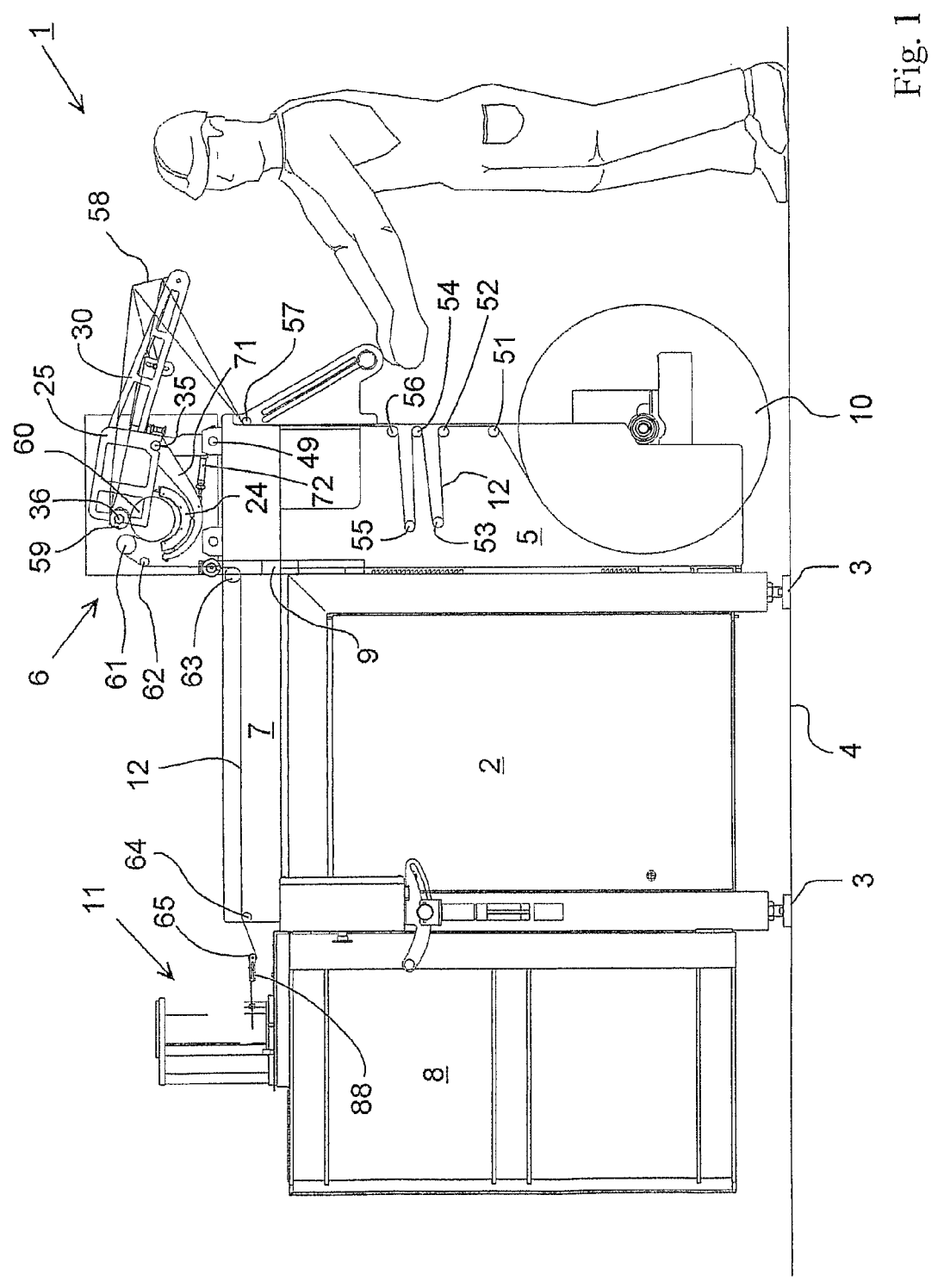
Figure 2:
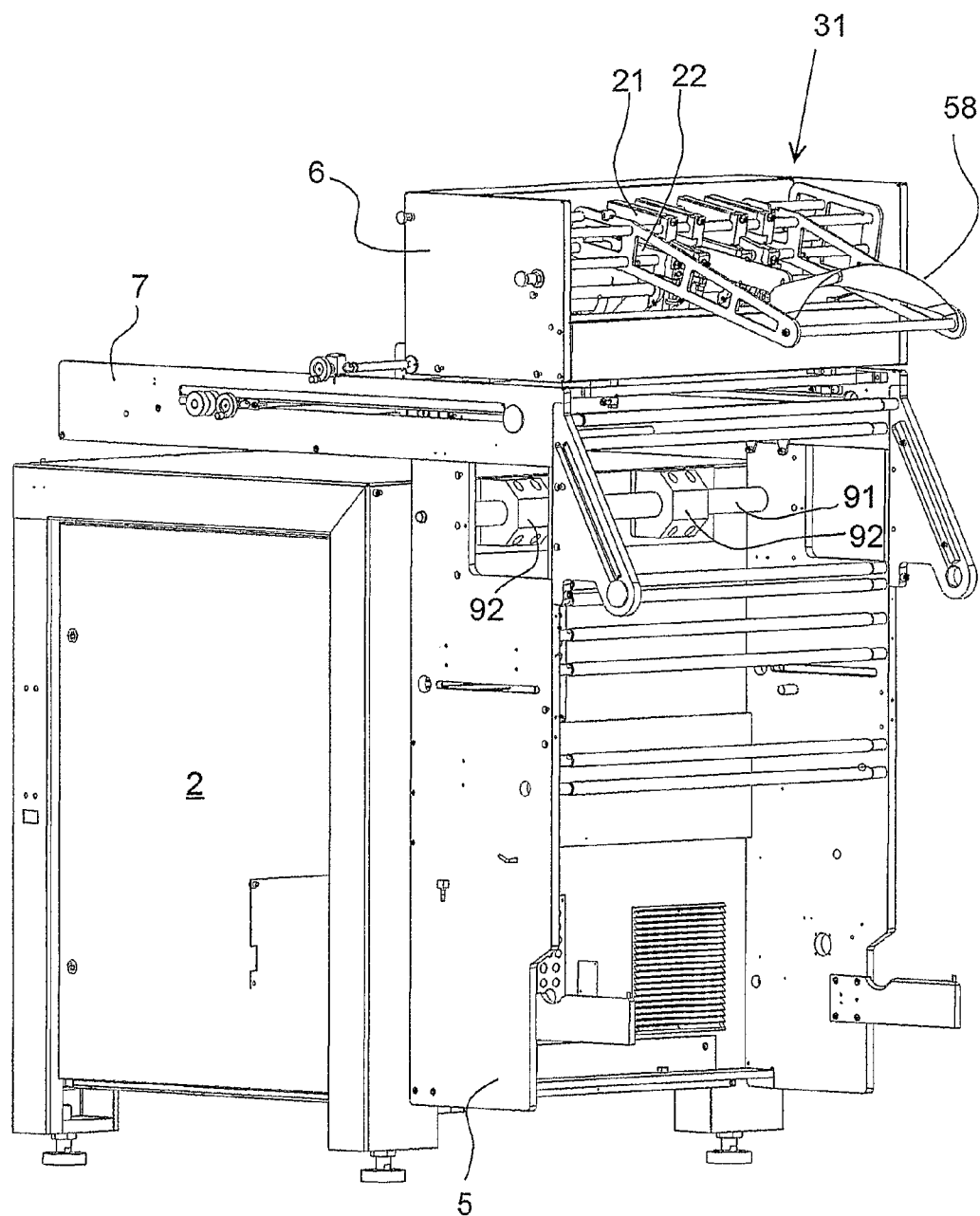
FIG. 2 is a perspective view of the packaging device of FIG. 1 without the column forming part.

The packaging device 1 according to FIGS. 1-6 comprises a base part 2 with legs 3, via which the packaging device 1 is supported on the floor 4. The packaging device 1 further comprises a supply part 5, a corner forming part 6, a feed-through part 7 and a tube forming part 8. Said parts 5-8 are connected to the base part 2, with the corner forming part 6 and the tube forming part 8 being rigidly connected to the base part 2 in use, inter alia via the arm 9 (not shown in FIG. 2) in the case of the corner forming part 6, whilst the supply part 5 and the feed-through part 7, which extends between the supply part 5 and the corner forming part 6 at one end, are jointly movable in a direction perpendicular to the plane of the drawing of FIG. 1 relative to the base part 2, and thus also relative to the corner forming part 6 and the tube forming part 8.

The packaging device 1 is of the vertical forming, filling and sealing type (vertical form, fill and seal machines), the general principles of which are known to those skilled in the art. Foil 12 from a supply roll 10 is formed into a tube at the tube forming part 8, more specifically at the shoulder part 11 thereof, whereupon overlapping longitudinal edges of the foil are sealed together and a bottom for the eventual package (and at the same time a sealed upper side for a downstream package) are formed by sealing, which is done by locally pinching the tube together, using sealing jaws, after which the package is filled with products, for example powdery materials or discrete products such as dry dog food or snacks.

The packaging device 1 is based on a packaging device of which a corner forming part as described with reference to FIGS. 3 and 4 of Dutch patent NL 1032764 forms part. Insofar as said publication relates to the description of FIGS.

3 and 4, said publication shall be considered to be incorporated in the present description of the packaging device 1.

Using the corner forming part 6, areas of increased stiffness are created at the eventual corner edges of the packages to be produced by means of the packaging device 1 by forming overlapping sections in the longitudinal direction of the foil web, upstream of the tube forming part, which sections are sealed together.

FIG. 1 shows the path of the foil web 12 from the supply roll 10 through the packaging device 1. From the supply roll 10, the path of the foil web 12 extends along, in succession, the pulleys 51-57, the curved deforming edge 58, the rollers 59, 60 and the pulleys 61-65 to the shoulder element 11 of the tube forming part 8.

Between the curved deforming edge 58 and the roller 59, the corner forming part 6 comprises four upper deforming blocks 21 directly along the foil web 12, above the foil web 12, and lower deforming blocks 22 below the foil web 12, directly opposite the upper deforming blocks 21. The pairs of upper deforming blocks 21 and lower deforming blocks 22 define stepped gaps 23 therebetween, through which the foil web 12 passes in use. Because of its path along the curved deforming edge 58, the foil web 12 has a curved shape at that location, so that the width of the foil web 12 is reduced, seen in perpendicular view. The stepped gaps 23 form a more or less merlon-shaped profile in the foil web. The foil web 12 is flattened again on the roller 59, with overlapping sections being formed in those areas of the foil web 12 where it passed through the stepped gaps 23, as shown in FIG. 4 of NL 1032764, with the reduced width of the foil web 12 being at least substantially maintained, however.

Along the lower part of the circumference of the second roller 60, which has a larger diameter than that of the roller 59, the corner forming part 6 comprises four curved sealing shoes 24 at the location of the overlapping sections, which sealing shoes, in use, closely abut the lower half of the circumference of the second roller 60. By means of said sealing shoes 24, a continuous sealed joint is realised at the location of the overlapping sections, so that areas of increased stiffness extending in the longitudinal direction of the foil web 12 are formed in the foil web 12 at the location of the overlapping sections, which areas will eventually form parallel corner edges of the packages produced by means of the packaging machine 1.

Figure 3:
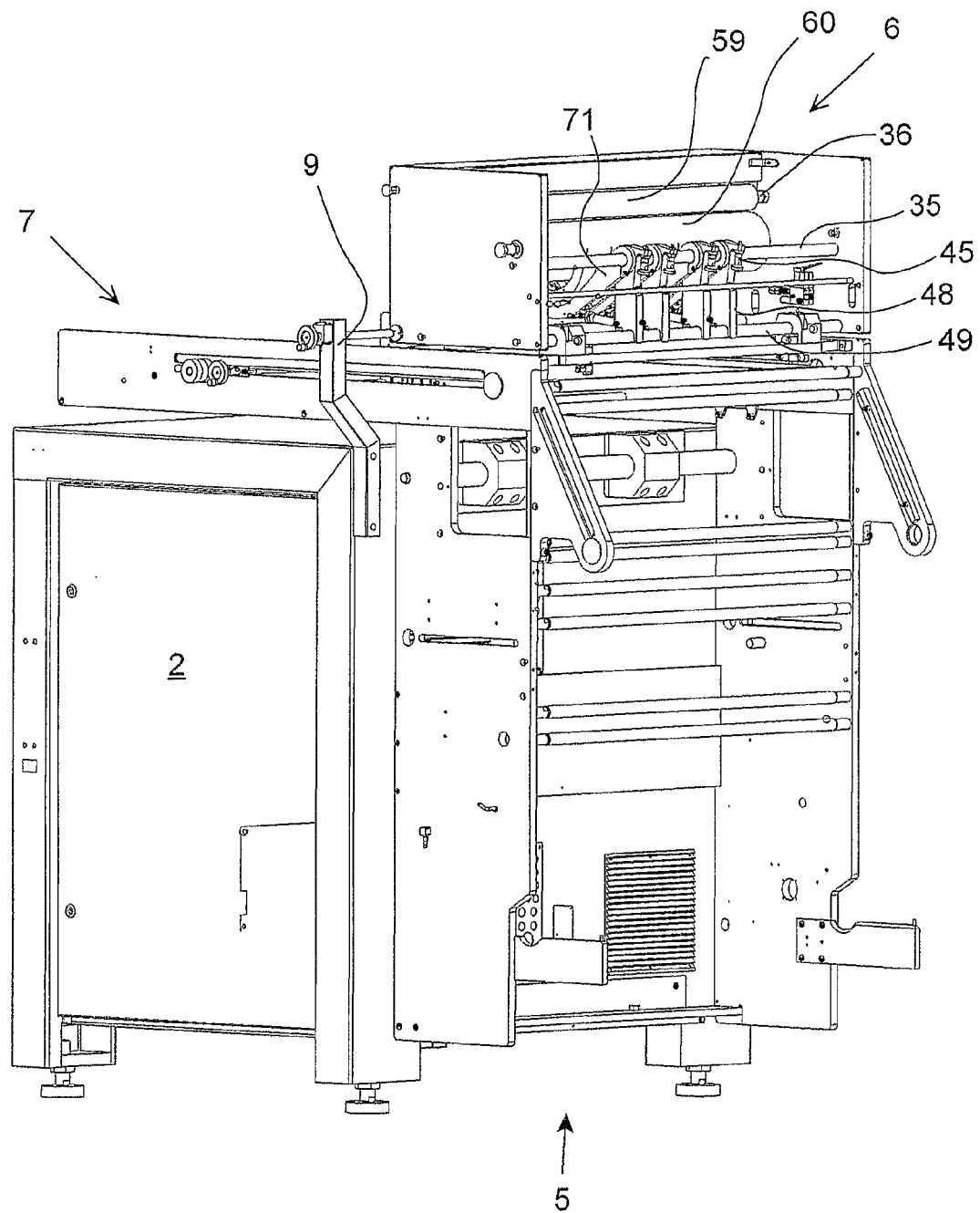
FIG. 3 shows the packaging device of FIG. 2, in this case without the switch part, however.
Figure 4:
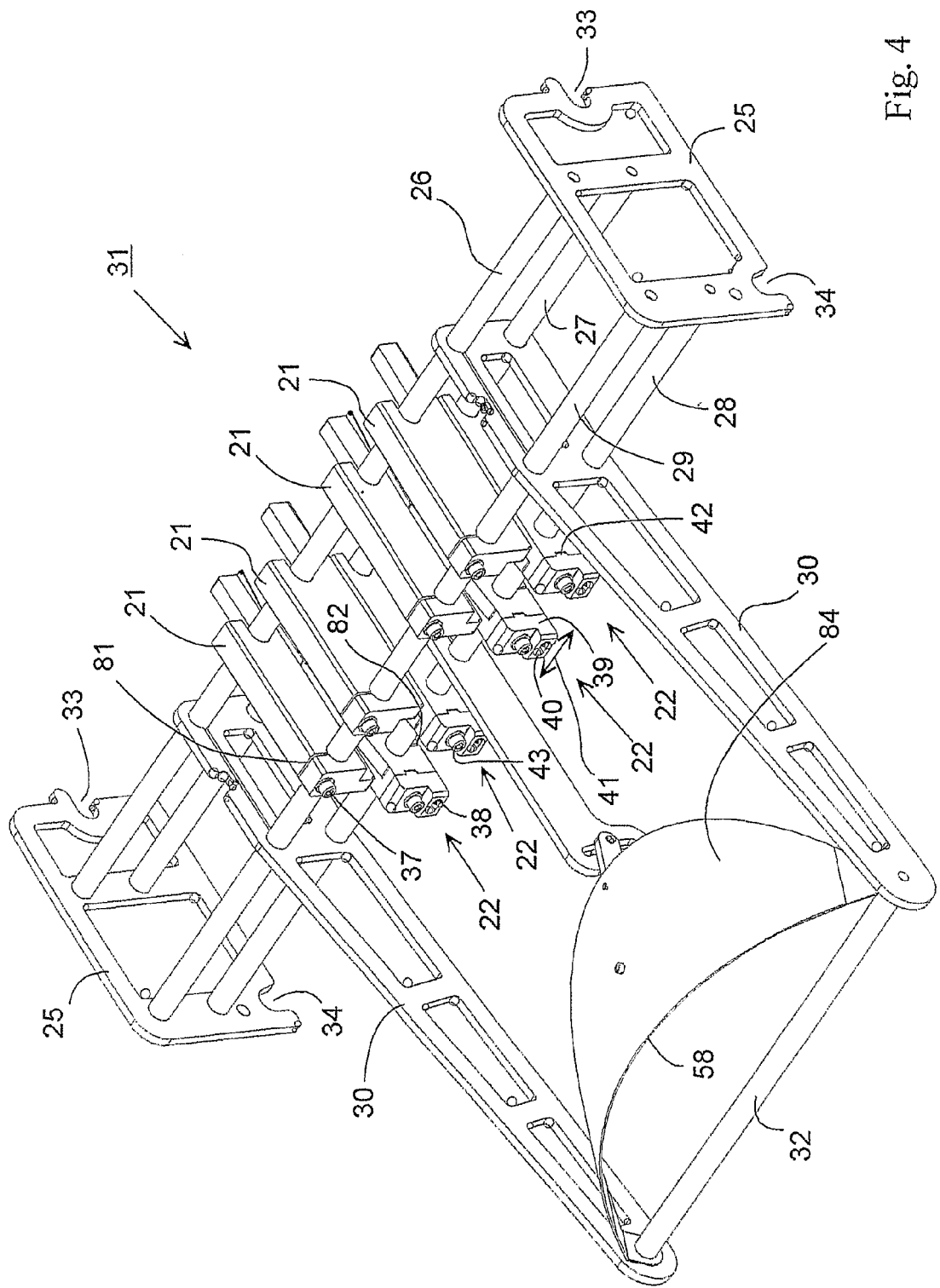
FIG. 4 is a perspective view of the switch part.
Figure 5:
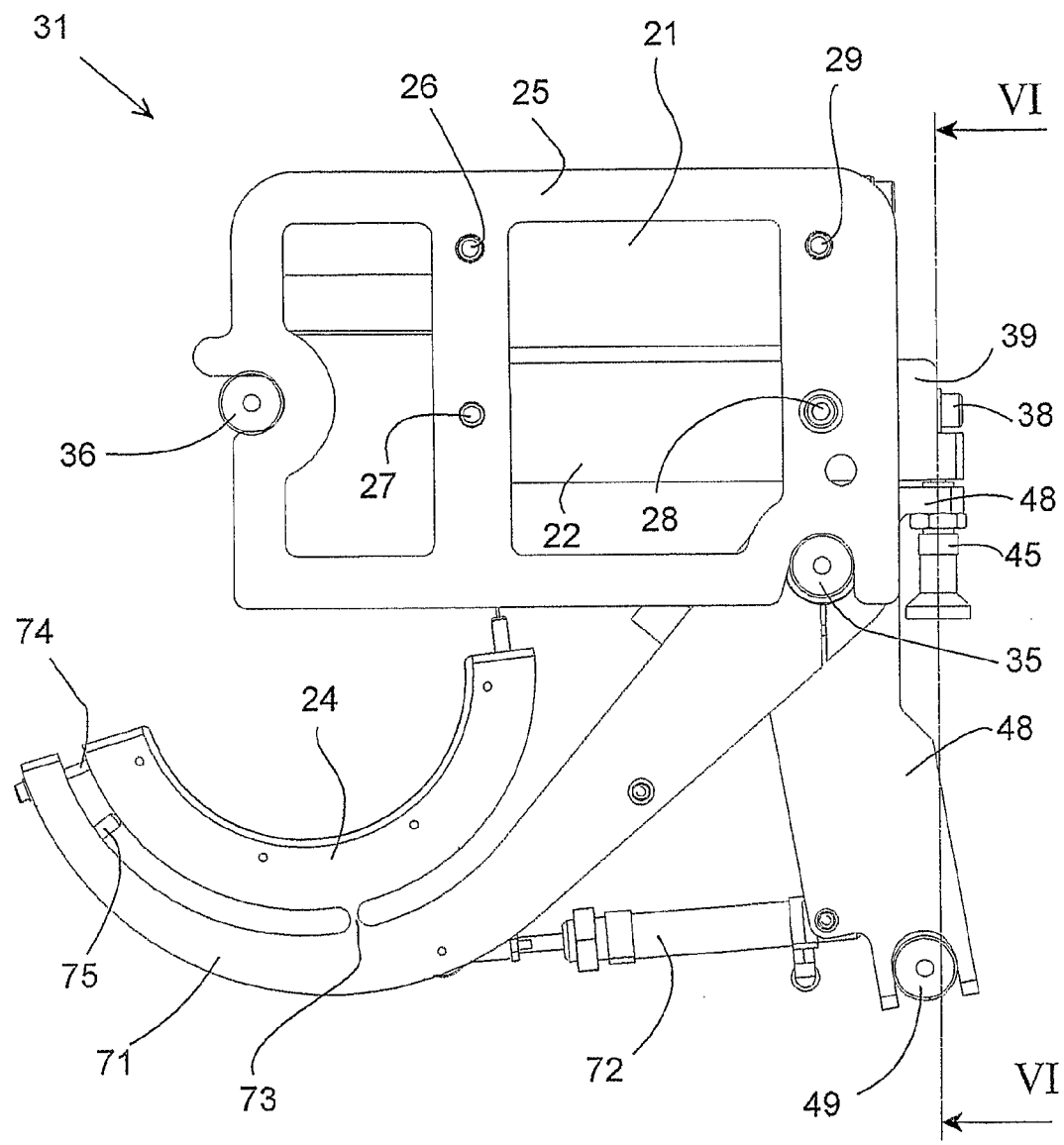
FIG. 5 is a side view of the switch part including the sealing shoe and the support thereof as forming part of the corner forming part.

FIGS. 2 and 3 show the packaging device 1 (in this case without the tube forming part 8), with and without, respectively, a switch unit 31 as forms part of the corner forming part 6. FIG. 4 shows the switch unit 31 separately. The switch unit 31 comprises the upper deforming blocks 21 and the lower deforming blocks 22, as well as the curved deforming element 84 with the previously mentioned deforming edge 58. The packaging device 1 has a number of associated switch units 31, 31', etc., which are in principle different from each other as regards the position of the deforming blocks 21, 22 and/or the specific shape of the deforming element 84. For the rest, the switch units 31, 31', etc. are in principle identical. More specifically this concerns the side plates 25, the four positioning rods 26-29 that extend between the side plates 25 and the arms 30, which are rigidly connected to the positioning rods 26-29 at one end and between the opposing other ends of which the deforming element 84 is provided. Furthermore, a dimensioning rod 32 is provided between the same ends of the arms 30, which rod ensures that the respective ends of the arms 30 will remain correctly spaced apart.

In use, the switch units 31, 31', etc. can be exchanged the moment a foil 12 having a different width is to be processed and/or if a different type of package is to be produced, whose corners are located at different positions. To enable an easy exchange of the switch units 31, 31', etc., semicircular recesses 33, 34 are provided in the side plates 25. Said recesses 33, 34 cooperate with rods 35, 36, which form a permanent part of the corner forming part 6 (see FIG. 5). As is shown in FIG. 3, the rod 36 is in fact a through shaft of the roller 59, about which the roller 59 can rotate in bearings. The side plates 25 engage the ends of the rod 36 that extend outside the ends of the roller 59. The switch unit 31, which is only shown in part in FIG. 5, can be removed from the corner forming part 6 in a simple manner by tilting the switch unit 31 upwards about the rod 36, starting from the situation shown in FIG. 5, after which the switch unit 31 can be moved away from the rod 36 once the recesses 34 are clear of the rods 35. In the reverse order, another switch unit 31' can be placed in the corner forming unit 6 in a simple manner.

The deforming blocks 21, 22 are in principle slidable along the positioning rods 26-29. By tightening the socket screws 37, 38 associated with the respective deforming blocks 21, 22, the deforming blocks 21, 22 can be fixed in position relative to the positioning rods 26-29 because the respective deforming blocks 21, 22 clamp down on the associated rod 29, 28 in that case, to which end material of the deforming blocks 21, 22 clamps down on the circumference of the rods 29, 28 on either side of the respective gaps 81, 82 as a result of the sockets screw 37, 38 being tightened. In principle this happens only once.

At the end facing the deforming element 84, the lower deforming blocks 22 are provided with adjusting blocks 39. Near their bottom side, the adjusting blocks 39 are provided with horizontal through slotted holes 40, within which the heads of the aforesaid socket screws 38 extend. The adjusting blocks 39 are to a limited extent adjustable in the directions indicated by the double arrow 41 relative to the associated lower deforming blocks, to which end a horizontally extending guide 42 is provided for each combination of a lower deforming block 22 and an associated adjusting block 39. A socket screw is provided for fixing the adjusting blocks 39 in position relative to the associated lower deforming block 22, which socket screw extends through a through hole in the adjusting block 39 into an internal screw thread in the respective lower deforming block 22.

Figure 6:
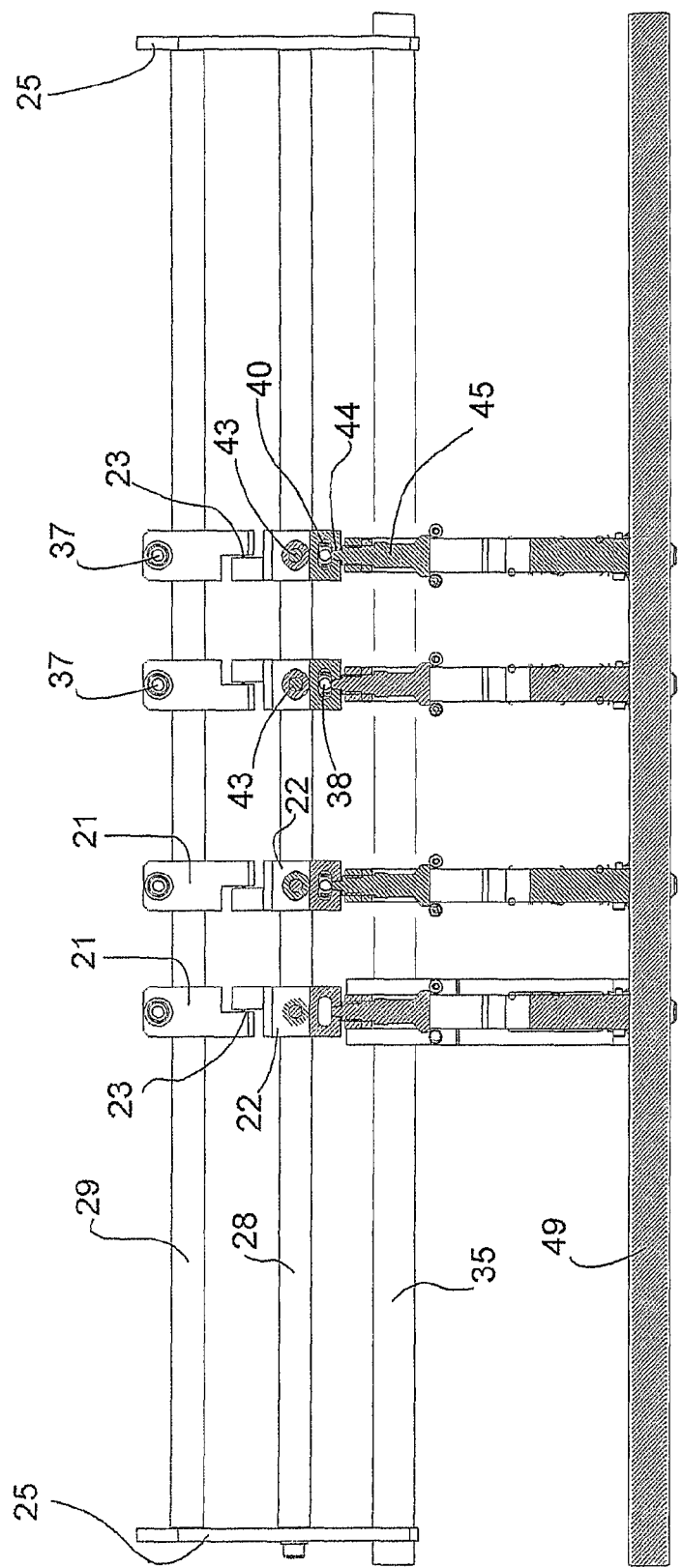
FIG. 6 is a sectional view along the line VI-VI in FIG. 5.

At the bottom side of each adjusting block 39, a vertically oriented round fitted hole 44 is provided, as is shown in cross-sectional view in FIG. 6, in which the end of a fitted dowel 45 fits. Shortly below the aforesaid end, the fitted pin 45 is accommodated in the horizontal part of the fixed arm 48, which has a reverse J-shape. The fixed arm 48 has a semicircular recess at its bottom side, at which recess the fixed arm 48 is supported on the rod 49. A substantially J-shaped pivot arm 71 is provided for positioning the sealing shoe 24 relative to the roller 60, with the curve of the sealing shoe 24 being substantially concentric with the curve of the J-shape.

The pivot arm 71 is pivotable about the central axis of the rod 35 with respect to the fixed arm 48. In the longitudinal direction of the rod 35, however, the fixed arm 48 and the pivot arm 71 are fixed in position relative to each other, however, so that the longitudinal position of the fixed arm 48 relative to the rod 35 also determines the longitudinal position of the pivot arm 71, and thus of the sealing shoe 24, relative to the rod 35. Because of the alignment by means of the fitted dowel 45 and the fitted hole 44 in the adjusting block 39, the position of the adjusting block 39 relative to the lower deforming block 22 thus eventually determines the position of the sealing shoe 24 relative to the lower deforming block 22, at least in a direction perpendicular to the plane of the drawing of FIG. 5. Thus it is possible to correctly position the sealing shoe 24 relative to the associated lower deforming block by a once-only adjustment of the adjusting block 39 relative to the associated lower deforming block 22.

Each sealing shoe 24 can be moved manually along the rods 35 and 49 in combination with the associated fixed arm 48 and the pivot arm 71, such that the fitted dowel 45 will be aligned with the fitted hole 44 associated with the replacing switch part 31', whereupon the end of the fitted dowel 45 is moved into the respective fitted hole 44 again. The construction by means of which the fitted dowel 45 is accommodated in the fixed arm 48 is not shown in further detail in the figures. Said construction is a bayonet-like construction, so that the fitted dowel 45 can on the one hand be axially moved into the receiving hole in the fixed arm 48, whilst on the other hand the fitted dowel 45 can be axially locked in position in the receiving hole in the fixed arm 48 by being rotated through a specific angle, for example after the fitted dowel 45 has been moved into the fitted hole 44. The sealing shoe 24 can thus be correctly positioned relative to the replacing switch part 31' in a very short time.

A cylinder 72 acts between the fixed arm 48 and the pivot arm 71, which cylinder presses the sealing shoe against the roller 60 during normal operation. When the foil web 12 is temporarily stationary, the cylinder 72 slightly retracts the pivot arm 71, and thus the sealing shoe 24, from the roller 60 by pivoting about the central axis of the rod 35 so as to prevent thermal overload of the foil web 12.

The sealing shoe 24 is connected to the pivot arm 71 by means of a film hinge 73. Said film hinge 73 allows a further fine adjustment of the sealing shoe 24 relative to the pivot arm 71. Two adjustment bolts 74, 75 are furthermore provided at the end of the pivot arm for realising said fine adjustment. The adjustment bolt 75 pushes off against the outer side of the sealing shoe 24, whilst the adjustment bolt 74 pulls the sealing shoe 24 towards the pivot arm 71.

As already indicated in the foregoing, the supply part 5 and the feed-through part 7 are jointly movable perpendicular to the plane of the drawing of FIG. 1 with respect to the remaining part of the packaging device. The packaging device to that end comprises moving means, for example comprising at least one screw-spindle combination, which operates in dependence on control signals on the basis of the detections from the sensor 88 disposed a short distance upstream of the shoulder part 11. In addition to that, the packaging device 1 comprises a guide rod 91 that forms part of the supply part 5, which guide rod extends within guide blocks 92 that form part of the base part 2 (see FIG. 2). The sensor 88 detects whether the position of the longitudinal edge of the foil web 12 deviates from a desired position of said longitudinal edge, and if so, to what extent. In case of a deviation, control means (not shown) will activate the moving means on the basis of signals from the sensor 88, so that the foil web 12 will take up the desired transverse position again. It has been found to be very advantageous if the corner forming part 6 and the tube forming part 8 remain in their fixed position relative to each other.

The invention claimed is:

1. A device for packaging products in a foil package, comprising feed-through means for continuously supplying a foil web from a supply roll to a corner forming unit, said corner forming unit comprising, in succession, a curved deforming edge for deforming the flat foil web to a curved foil web having a reduced width, deforming means for forming a profile in the curved foil web, a roller-for flattening the profiled foil web, with the reduced width of the foil web at least substantially being maintained and overlapping sections of said foil web being formed at the location of the profile, and first sealing means for sealing said overlapping sections of said foil web, said device further comprising a shoulder element, to which the foil web comprising the sealed overlapping sections is supplied by the feed-through means for deforming the foil web into a tube at the location of the shoulder element, along the path of which tube second sealing means are disposed for joining longitudinal edges of the foil web together and forming a sealed bottom side and upper side of a package perpendicular to the longitudinal direction of the tube, with the sealed overlapping sections forming the corners of the package, wherein the deforming edge and the deforming means form part of an exchangeable switch unit and in that the first sealing means is movable along at least one guide extending parallel to the central axis of the roller, with the corner forming unit comprising aligning elements associated with the first sealing means, which aligning elements cooperate with further aligning elements associated with the deforming means for correctly positioning the first sealing means relative to the deforming means.

2. A device according to claim 1, wherein said aligning elements and said further aligning elements are of the mortise and tenon type.

3. A device according to claim 2, wherein said first sealing means comprise an arcuate sealing shoe, which is concentric with a roller, over part of the circumference of which the foil web extends, wherein the sealing shoe is pivotally connected, about a pivot axis that extends parallel to the central axis of the roller, to a support for the sealing shoe via hinge means, and wherein the sealing shoe can be fixed in its pivoted position relative to the support via fixing means.

4. A device according to claim 2, wherein the device further comprises sensor means for detecting the position of a longitudinal edge of the foil web, as well as moving means for moving at least one first pulley, over part of the circumference of which the foil web is passed between the corner of said forming unit and the shoulder element, and the supply roll transversely to the direction of movement of the foil web in dependence on detections made by the sensor means, whilst the corner forming unit and the shoulder element maintain a fixed orientation relative to each other during operation of the moving means.

5. A device according to claim 4, wherein said moving means are also arranged for moving at least one second pulley, over part of the circumference of which the foil web is passed between the corner forming unit and the supply roll, transversely to the direction of movement of the foil web in dependence on detections made by the sensor means.

6. A device according to claim 4, wherein said moving means are arranged for jointly moving said at least one first pulley, between the corner forming unit and the shoulder element, and moving the supply roll and said at least one second pulley, between the corner forming unit and the supply roll, to the same extent.

7. A device according to claim 6, wherein said first sealing means comprise an arcuate sealing shoe, which is concentric with a roller, over part of the circumference of which the foil web extends, wherein the sealing shoe is pivotally connected, about a pivot axis that extends parallel to the central axis of the roller, to a support for the sealing shoe via hinge means, and wherein the sealing shoe can be fixed in its pivoted position relative to the support via fixing means.

8. A device according to claim 5, wherein said first sealing means comprise an arcuate sealing shoe, which is concentric with a roller, over part of the circumference of which the foil web extends, wherein the sealing shoe is pivotally connected, about a pivot axis that extends parallel to the central axis of the roller, to a support for the sealing shoe via hinge means, and wherein the sealing shoe can be fixed in its pivoted position relative to the support via fixing means.

9. A device according to claim 8, wherein said hinge means comprise a film hinge.

10. A device according to claim 4, wherein said first sealing means comprise an arcuate sealing shoe, which is concentric with a roller, over part of the circumference of which the foil web extends, wherein the sealing shoe is pivotally connected, about a pivot axis that extends parallel to the central axis of the roller, to a support for the sealing shoe via hinge means, and wherein the sealing shoe can be fixed in its pivoted position relative to the support via fixing means.

11. A device according to claim 10, wherein said hinge means comprise a film hinge.

12. A device according to claim 1, wherein the device further comprises sensor means for detecting the position of a longitudinal edge of the foil web, as well as moving means for moving at least one first pulley, over part of the circumference of which the foil web is passed between the corner of said forming unit and the shoulder element, and the supply roll transversely to the direction of movement of the foil web in dependence on detections made by the sensor means, whilst the corner forming unit and the shoulder element maintain a fixed orientation relative to each other during operation of the moving means.

13. A device according to claim 12, wherein said moving means are also arranged for moving at least one second pulley, over part of the circumference of which the foil web is passed between the corner forming unit and the supply roll, transversely to the direction of movement of the foil web in dependence on detections made by the sensor means.

14. A device according to claim 13, wherein said moving means are arranged for jointly moving said at least one first pulley, between the corner forming unit and the shoulder element, and moving the supply roll and said at least one second pulley, between the corner forming unit and the supply roll, to the same extent.

15. A device according to claim 14, wherein said first sealing means comprise an arcuate sealing shoe, which is concentric with a roller, over part of the circumference of which the foil web extends, wherein the sealing shoe is pivotally connected, about a pivot axis that extends parallel to the central axis of the roller, to a support for the sealing shoe via hinge means, and wherein the sealing shoe can be fixed in its pivoted position relative to the support via fixing means.

16. A device according to claim 13, wherein said first sealing means comprise an arcuate sealing shoe, which is concentric with a roller, over part of the circumference of which the foil web extends, wherein the sealing shoe is pivotally connected, about a pivot axis that extends parallel to the central axis of the roller, to a support for the sealing shoe via hinge means, and wherein the sealing shoe can be fixed in its pivoted position relative to the support via fixing means.

17. A device according to claim 12, wherein said first sealing means comprise an arcuate sealing shoe, which is concentric with a roller, over part of the circumference of which the foil web extends, wherein the sealing shoe is pivotally connected, about a pivot axis that extends parallel to the central axis of the roller, to a support for the sealing shoe via hinge means, and wherein the sealing shoe can be fixed in its pivoted position relative to the support via fixing means.

18. A device according to claim 1, wherein said first sealing means comprise an arcuate sealing shoe, which is concentric with a roller, over part of the circumference of which the foil web extends, wherein the sealing shoe is pivotally connected, about a pivot axis that extends parallel to the central axis of the roller, to a support for the sealing shoe via hinge means, and wherein the sealing shoe can be fixed in its pivoted position relative to the support via fixing means.

19. A device according to claim 18, wherein said hinge means comprise a film hinge.

20. A corner forming unit for use in a device for packaging products in a foil package, comprising, in succession, a curved deforming edge for deforming the flat foil web to a curved foil web having a reduced width, deforming means for forming a profile in the curved foil web, a roller for flattening the profiled foil web, with the reduced width of the foil web at least substantially being maintained and overlapping sections being formed at the location of the profile, and sealing means for sealing said overlapping sections, said deforming edge and said deforming means forming part of an exchangeable switch unit and said sealing means being movable along at least one guide extending parallel to the central axis of the roller, and comprising aligning elements which cooperate with further aligning elements of the deforming means for correctly positioning the sealing means relative to the deforming means.

* * * * *